July 14, 1970  R. BECKER  3,520,143
PROCESS FOR THE SEPARATION OF MIXTURES WITH COMPONENTS HAVING
WIDELY SPACED BOILING POINTS BY REFRACTION, PARTIAL
CONDENSATION IN A REGENERATOR AND RECYCLE OF
HIGH BOILING MATERIAL
Filed July 27, 1966  4 Sheets-Sheet 2

INVENTOR
RUDOLF BECKER
BY *J. William Miller*
ATTORNEY

July 14, 1970  R. BECKER  3,520,143
PROCESS FOR THE SEPARATION OF MIXTURES WITH COMPONENTS HAVING
WIDELY SPACED BOILING POINTS BY REFRACTION, PARTIAL
CONDENSATION IN A REGENERATOR AND RECYCLE OF
HIGH BOILING MATERIAL
Filed July 27, 1966    4 Sheets-Sheet 1

INVENTOR
RUDOLF BECKER
BY
ATTORNEY

__3,520,143__
__PROCESS FOR THE SEPARATION OF MIXTURES WITH COMPONENTS HAVING WIDELY SPACED BOILING POINTS BY REFRACTION, PARTIAL CONDENSATION IN A REGENERATOR AND RECYCLE OF HIGH BOILING MATERIAL__
Rudolf Becker, Munich-Solln, Germany, assignor to Linde Aktiengesellschaft, Wiesbaden, Germany
Filed July 27, 1966, Ser. No. 568,224
Claims priority, application Germany, July 28, 1965, G 44,296
Int. Cl. F25j 3/06, 5/00; C10g 7/02
U.S. Cl. 62—28                                                  1 Claim

ABSTRACT OF THE DISCLOSURE

Separating a mixture having a wide boiling point range by:

(a) rectifying in a distillation column said mixture which is supplied at an upper section thereof at least partly in the liquid phase, and withdrawing from the column a bottoms fraction enriched in higher boiling component and a gaseous overhead fraction enriched in lower boiling point component;

(b) treating gaseous overhead fraction alone in a further separation step such as interchangeable regenerators, dephlegmators, interchangeable adsorbers, and absorption, wherein there is removed a fraction of higher boiling components therefrom, and withdrawing the remaining treated gaseous fraction as product; and (c) recycling to the distillation column all higher boiling point fraction resulting from step (b), all of said latter fraction being introduced into the column at about the midpoint thereof.

---

This invention relates to the production of gases having a high purity, more particularly, to a process and apparatus for the separation of a mixture whose components have widely spaced boiling points, wherein the mixture is introduced into the head of a rectification column in the liquid phase, and the vapor mixture collecting in the head of the column is subjected to a further separation process.

In the conventional low temperature process for the separation of a gas mixture, the gas mixture to be separated is introduced, in the liquid phase, into a rectification column at about the midpoint thereof, the mixture being rectified in the stripping section below the feed point in the column. The vapor mixture forming at the feed point and rising in the upper enrichment section of the column, is enriched in the lower boiling point component. The gases collecting at the head of the column are then passed through a high pressure cycle wherein they are compressed, cooled, and liquefied, expanded, and re-introduced into the rectification column as reflux liquid.

When separating a mixture having components with widely different boiling points there is a correspondingly wide temperature differential between the head and sump of the rectification column, and there are likewise high temperature differentials in the high pressure cycle used to provide reflux liquid. The existence of such large temperature differences in the system requires a higher energy input and in many cases makes necessary the use of a multi-stage compression. For example, when separating a gas mixture of methane, ethane, and ethylene according to the conventional process, gaseous methane is withdrawn from the head of the rectification column at a temperature of about 120° K. and partially liquefied in the so-called methane cycle, while in the sump of the rectification column the $C_2$ hydrocarbons are being boiled at a temperature of about 200° K. Since the heat of evaporation supplied to the sump liquid is derived from the condensing methane in the methane cycle, extremely high cycle pressures, on the order of about 50 atmospheres, are needed.

In other known low temperature rectification processes for separating a gas mixture having components with widely different boiling points, liquefied gas mixture is introduced into the head of the rectification column as reflux, and the lower boiling gaseous components are withdrawn from the head of the column. The gaseous head product, however, still contains substantial quantities of higher boiling components. Consequently, there is an undesirable high loss in yield of the higher boiling components, on the one hand, and an undesirable high contamination of the lower boiling components, on the other hand.

It is therefore a principal object of the invention to provide a novel and improved method and apparatus for the separation of mixtures having components with widely different boiling points.

Another object is to provide in the low temperature separation of a mixture having components with widely different boiling points by rectification, an improved process and apparatus to enrich overhead gases from the rectification column without requiring an auxiliary high pressure cycle.

The present invention comprises introducing the feed mixture to be separated which is in the liquid or substantially liquid phase, into an upper section of a rectification column, and subjecting vapor mixture collecting in the head of the column to a further separation step wherein there is obtained as the final product a first portion enriched in the lower boiling component of the mixture, and a second portion enriched in higher boiling components, the latter portion then being re-introduced into the rectification column, preferably in the gaseous phase, at approximately the middle section thereof.

The feed is introduced into the top plate in the column. The recycle stream is introduced as above said, at approximately the middle section of the column. If the further separation step is more or less efficient, the point of introduction of the recycle stream may be nearer the bottoms, or near the top of the column.

The further separation step of the present invention can be carried out according to any one of the several different embodiments, it being preferred to carry out this step by either partial condensation, by adsorption, or by washing with solvents. In one embodiment of the invention, the further separation step is carried out in cyclically exchangeable regenerators containing heat storage bodies, the latter bodies being cooled and regenerated during one cycle by contacting the same with cold expanded gas in this separation step. Another embodiment comprises conducting the further separation step in a dephlegmator (backflow condenser) which is cooled by expanded liquid and gaseous components from this separation step.

When using as the further separation step an adsorption procedure, higher boiling components collected in the adsorber are removed therefrom by heating the adsorption mass and scavenging with a portion of the lower boiling component of the mixture, the impurity laden scavenging gas then being fed into the rectification column at the midsection thereof.

A still further embodiment of the further separation step comprises passing the vapor mixture collecting in the head of the rectification column into the foot of a washing column where it is washed with a solvent, the lower boiling component being withdrawn from the head of the washing column. In the solvent regeneration cycle, spent solvent from the washing column is passed into the head of the stripping column where it is regenerated and then passed back into the washing column, the vapor mixture collecting in the head of the stripping column being recycled to the rectification column and introduced at about the midsection thereof.

The process of the present invention is particularly advantageous for the separation of a multicomponent mixture whose components have widely different boiling points, as for example from about −162° C. ($CH_4$) to −104° C. ($C_2H_4$). The process is desirably used for the separation of hydrocarbon mixtures of methane, ethane, ethylene, and other higher hydrocarbons. Other mixtures which can also be advantageously separated are mixtures of nitrogen and methane or ethane and propane.

When separating hydrocarbons by the adsorption procedure, it is desirable to employ as an adsorption mass activated coal, silica gel or molecular sieves.

Other objects and advantages of the present invention will be apparent upon reference to the accompanying description when taken in conjunction with the following drawings, wherein.

Figure 1:
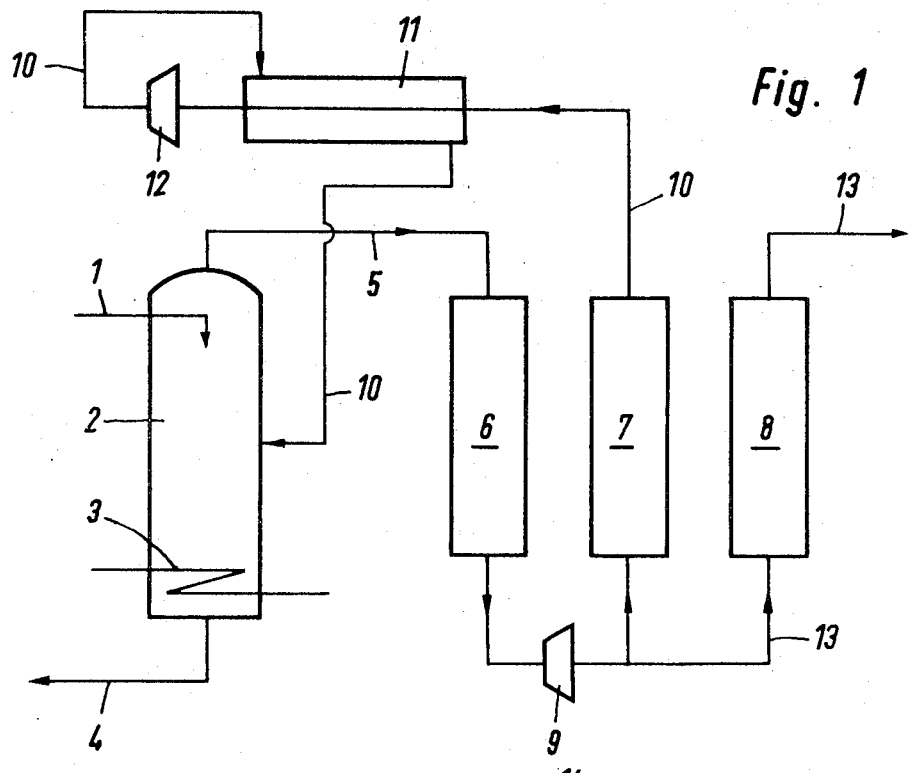
FIG. 1 is a schematic diagram of an apparatus for carrying out the further separation step by partial condensation in a regenerator.

The apparatus of the present invention is presented schematically in order to clarify the illustration and description of the invention and to facilitate the comprehension thereof. In order to further simplify the drawings, the switching elements of the regenerators and other cyclically exchangeable elements have been omitted. The function of the switching elements is reversed according to predetermined cycles. The arrows in the flow lines indicate the direction of flow within certain switching phases, and identical parts are designated by the same reference numerals throughout the several drawings. The embodiments described hereinafter are exemplary only and relate essentially to the separation of a gas mixture of ethane and ethylene, containing about 10% to 20% of methane.

In the apparatus illustrated in FIG. 1, a liquefied mixture of gases is fed via a feed line 1 into the head of rectification column 2 as reflux. An evaporation coil 3, through which flows gaseous ethylene, is provided in the sump of column 2, the ethylene being liquefied in this process by heat exchange with evaporating sump liquid.

From the bottom of column 2, the practically pure $C_2$ hydrocarbons, such as ethane and ethylene, are withdrawn while in the liquid phase via conduit 4. Gaseous methane, having a content of about 3% to 12% $C_2$ hydrocarbons, is collected at the head of column 2 and passed via conduit 5, to a further separation stage.

In the simplified schematic of FIG. 1, the further separation step is conducted in cyclically exchangeable regenerators 6, 7, and 8, shown here only with the connections used in a single operating period. The overhead methane with $C_2$ hydrocarbons is fed via conduit 5, to regenerator 6 where it is cooled, and the $C_2$ hydrocarbons are removed by condensation. The purified methane effluent from regenerator 6 passes through an expansion engine 9, and one portion of this methane is then passed through regenerator 7, after expansion, to absorb and carry away impurities deposited on the heat-storage bodies therein. The effluent from regenerator 7 passes into conduit system 10 which is connected sequentially to the first flow cross section of a countercurrent heat exchanger 11, a compressor 12, the second flow cross section of exchanger 11, and finally to the midsection of rectification column 2. The portion of the methane flowing through conduit system 10, having been enriched in regenerator 7 to a large extent with $C_2$ hydrocarbons, is warmed in countercurrent heat exchanger 11, compressed in compressor 12 to the pressure of the column, again cooled in countercurrent heat exchanger 11, and introduced, under pressure, into the column.

The other portion of expanded methane purified in regenerator 6 leaves the plant via conduit 13 and is, before its removal, warmed in regenerator 8.

Figure 2:
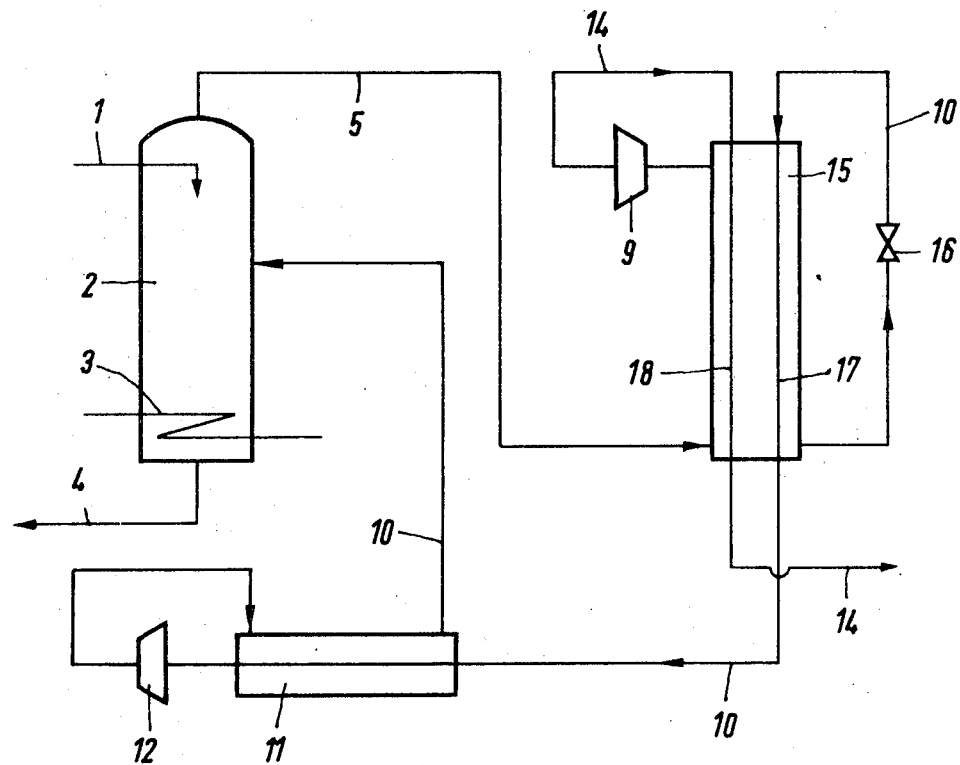
FIG. 2 is a schematic drawing of an apparatus for conducting the further separation step by partial condensation in a dephlegmator.

In the apparatus of FIG. 2, a dephlegmator 15 is used in place of regenerators for the further separation of the methane contaminated with $C_2$ hydrocarbons. In this embodiment, one portion of conduit system 10, which is provided with throttle valve 16, is connected between the foot of dephlegmator 15 and the upper entrance of a first flow channel 17 in dephlegmator 15, the lower end, in turn, being connected via conduit system 10 with the first flow cross section of countercurrent heat exchanger 11.

A conduit system 14 in the apparatus of FIG. 2, is first connected between the head of dephlegmator 15 and the intake of expansion engine 9, and secondly between the discharge of expansion engine 9 and the upper inlet of a second flow channel 18 in dephlegmator 15. The lower discharge end of channel 18 is also connected to conduit system 14.

The gaseous methane contaminated with $C_2$ hydrocarbons passes from the head of column 2, via conduit 5, into the bottom of the dephlegmator, where it is partially liquefied therein. The unliquefied portion of methane which is now completely free of $C_2$ hydrocarbons, is passed via conduit 14 to expansion engine 9. After being expanded, the pure methane enters, via conduit 14, into flow channel 18 where it is heated by indirect heat exchange with congealed $C_2$ hydrocarbon. The pure methane is discharged from the plant at the lower end of flow channel 18.

The liquefied portion of methane which is considerably enriched in higher boiling impurities is first withdrawn from the dephlegmator through conduit system 10, expanded in throttle valve 16, and then passed through first flow channel 17. There, the strongly contaminated methane is heated by indirect heat exchange with methane condensing externally thereof under increased pressure. The enriched and warmed methane fraction then passes through conduit system 10, via countercurrent heat exchanger 11, the compressor 12, and back to rectification column 2. If desired, the evaporation in the flow channel 17 is enhanced by passing methane into the system between the throttle valve 16 and heat exchanger 15 from conduit 14 by a connecting conduit with a throttle valve not shown in the figure.

Figure 3:
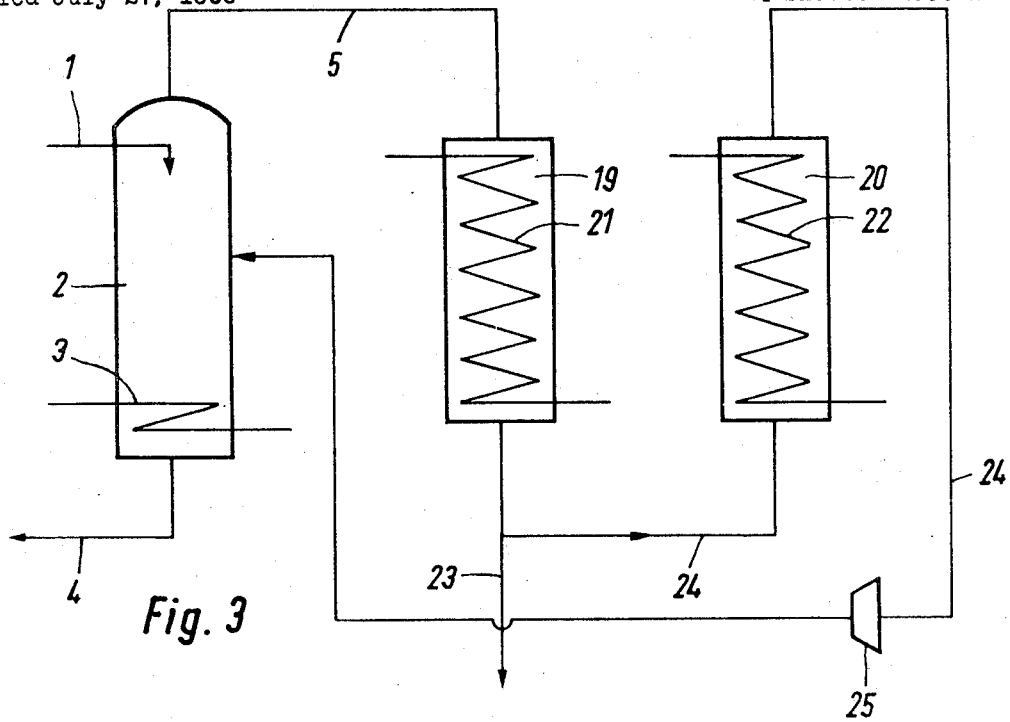
FIG. 3 is a schematic diagram of an apparatus for carrying out the further separation step in an adsorber.

In the plant shown in FIG. 3, the further separation step is carried out in adsorbers 19 and 20 which are provided with cooling and heating coils 21 and 22, respectively. In practice, adsorbers 19 and 20 are cyclically reversed, but for the sake of clarity, the connections shown are for only a single operating cycle. During this operating cycle, adsorber 19, which is connected via conduit 5, with the head of rectification column 2, adsorbs the impurities consisting essentially of $C_2$ hydrocarbons from the methane fed through conduit 5. In this process, liquid ethylene evaporating in cooling coil 21, serves to cool the adsorption mass.

One portion of the methane purified in adsorber 19, leaves the plant via conduit 23, the other portion of the purified methane passing via conduit system 24, through adsorber 20, circulating blower 25, and then into rectification column 2 at about the midsection thereof. To remove the impurities accumulating in adsorber 20, heating coils 22 are positioned therein for heating the adsorption mass, and the other portion of methane passing through the adsorber, desorbs and carries away the impurities. As the heating medium, gaseous ethylene under an elevated pressure can be used. By the use of this system, the desorption of impurities can be improved simply by lowering the pressure of the scavenging gas.

As compared to the composition of the stream in conduit 5, the gases in conduit 24 leaving adsorber 20 are considerably more loaded with impurities of higher hydrocarbons. The recycle is passed to a point in the column corresponding to the composition of the recycle stream.

Figure 4:
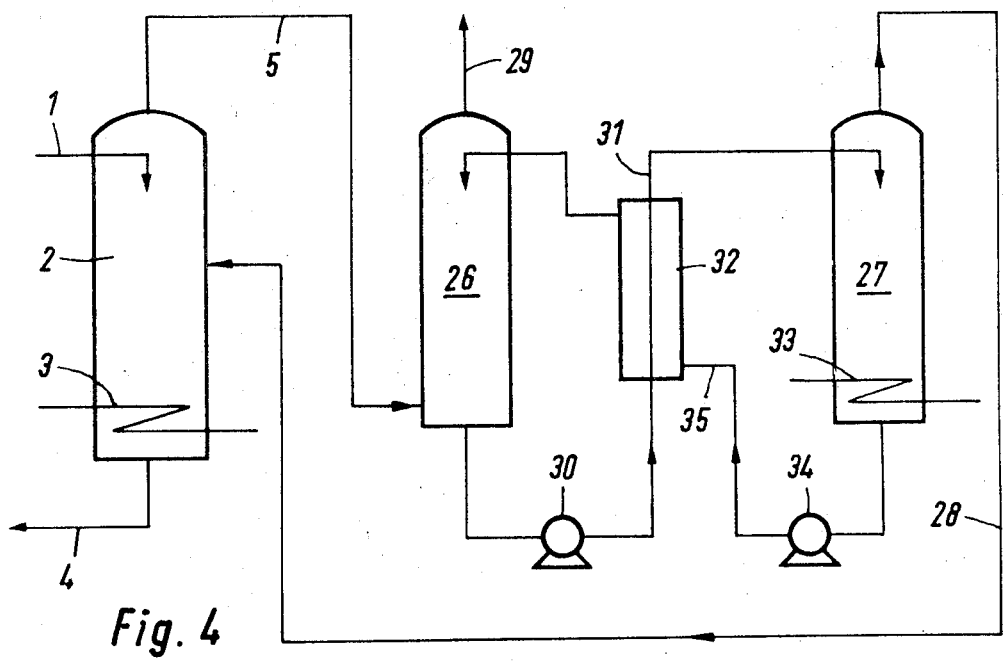
FIG. 4 is a schematic diagram of an apparatus for conducting the further separation step by washing with a solvent, there being illustrated a washing and stripping column for use therein.

In the apparatus of FIG. 4, the further separation is achieved by washing out higher boiling impurities from the lower boiling components. The conduit 5, carrying from the head of the rectification column the gases collecting therein, feeds the same to the foot of washing column 26 which is supplied with washing liquid from stripping column 27. The head section of the stripping column 27 is, in turn, connected, via a conduit 28, with the midsection of rectification column 2.

The gaseous methane contaminated with higher hydrocarbons is passed from the rectification column via conduit 5 into the bottom of washing column 26, where it rises in countercurrent contact with downwardly flowing liquid propane washing liquid. The purified methane leaves the plant through conduit 29 and the washing liquid now containing the higher hydrocarbons is withdrawn, with the aid of circulation pump 30, from the bottom of washing column 26 via conduit 31. This liquid is then passed through heat exchanger 32, where the charged washing liquid absorbs heat, and then conveyed to the head of stripping column 27.

The stripping column 27, operated at an overall higher temperature than washing column 26, is heated by evaporator coil 33. During the stripping process, the propane serving as the washing liquid in column 26, loses the absorbed impurities and is withdrawn from the foot of the stripping column 27, with the aid of circulating pump 34. This liquid is passed via conduit 35 through heat exchanger 32 and then conveyed to the head of washing column 26. In the heat exchanger 32, the warm-washing liquid is cooled.

The higher boiling hydrocarbons removed from the liquid propane in stripping column 27 are passed via conduit 28, into rectification column 2 and are subsequently withdrawn at the bottom thereof through conduit 4.

Figure 5:
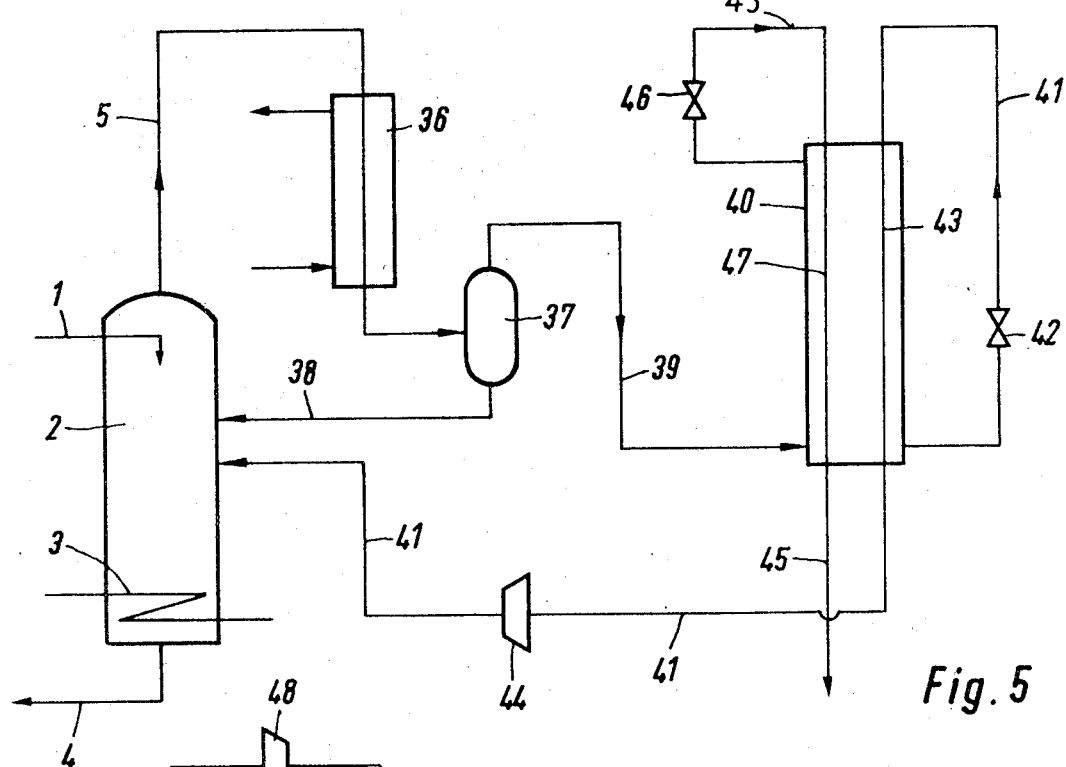
FIG. 5 is a schematic drawing of a modified embodiment of the apparatus of FIG. 2, particularly suitable for the separation of relatively high boiling gas mixtures.

In the installation shown in FIG. 5, higher boiling hydrocarbons, such as butane and pentane, for example, can be separated from lower boiling hydrocarbons, such as, for example, methane, ethane and propane. For this purpose, the operating pressure of the rectification column 2 is maintained high enough to condense, at about room temperature, the components of the mixture. From the head of the column, the gas mixture of lower hydrocarbons, up to about $C_3$, having a small proportion of higher hydrocarbons from about $C_4$ on upward, is passed, via conduit 5, into dephlegmator 36 which is operated with cooling water. In the dephlegmator 36, the larger portion of the higher hydrocarbons, such as butane and pentane, are condensed and collected in a liquid trap 37, the collected liquid then being reintroduced via a conduit 38 into rectification column 2 at about the midpoint thereof. The gaseous phase discharged from dephlegmator 33 flows via liquid separator 37, and a conduit 39, into dephlegmator 40 operating under low temperature, wherein partial condensation occurs again. This latter liquefied portion of the gas mixture containing higher hydrocarbons passes via conduit system 41, in correspondence with its concentration, into the rectification column 2, at about the midsection thereof. Before entering rectification column 2, the portion of the gas mixture liquefied in the dephlegmator 40 is expanded in throttle valve 42, warmed by heat exchange with condensing gas in a first flow channel 43 of dephlegmator 40, and again brought to an elevated pressure before it enters the rectification column 2, this being done in compressor 44.

The uncondensed portion of the gas mixture leaves dephlegmator 40, via line 45 and is expanded in a throttle valve 46. Before leaving the plant, this gas mixture is warmed, in a second flow channel 47 in heat exchange with condensing gas mixture. The gas mixture exiting via conduit 45 is completely free from higher hydrocarbons, such as butane and pentane, the latter compounds being withdrawn via conduit 4 from the bottom of rectification column 2.

The embodiment described in connection with FIG. 5 can be conducted without substantial alterations, or also in the similar apparatus shown in FIG. 6, wherein the process is conducted under modified pressure conditions.

Figure 6:
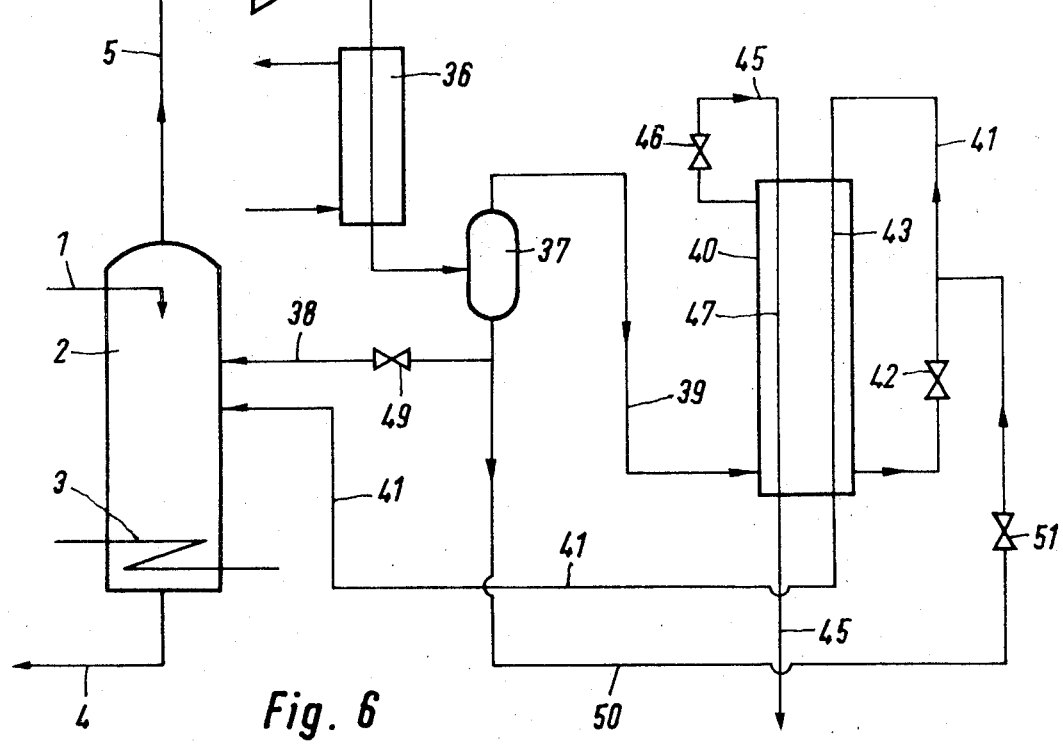
FIG. 6 is a schematic drawing of another modified embodiment of the apparatus of FIG. 5 of the drawings.

In the modification illustrated in FIG. 6, the gas mixture exiting via conduit 5 from rectification colume 2 is compressed, before entering the water-cooled dephlegmator 36, by a compressor 48 to a pressure of about 20 atmospheres gauge. The condensate collecting in liquid separator 37 is again expanded in throttle valve 49 to a pressure of about 4 atm. gauge before it flows back, via conduit 38, into column 2. Also, the condensate formed in dephlegmator 40 is expanded in throttle valve 42 from a pressure of about 20 atm. gauge to about 4 atm. gauge, and is reintroduced into column 2 via conduit 41 without being compressed. Thus, in the plant of FIG. 6, the compressor 44 in conduit 41, illustrated in FIG. 5, is omitted.

To compensate for refrigeration losses in the plant shown in FIG. 6, a portion of the condensate collecting in liquid separator 37 is withdrawn via conduit 50, expanded in throttle valve 51 to a pressure of about 4 atm. gauge, and then added to the condensate flowing through flow channel 43. Under the above-stated pressures, the temperature in the bottom of the rectification column 2 is about 100° C.

Figure 7:
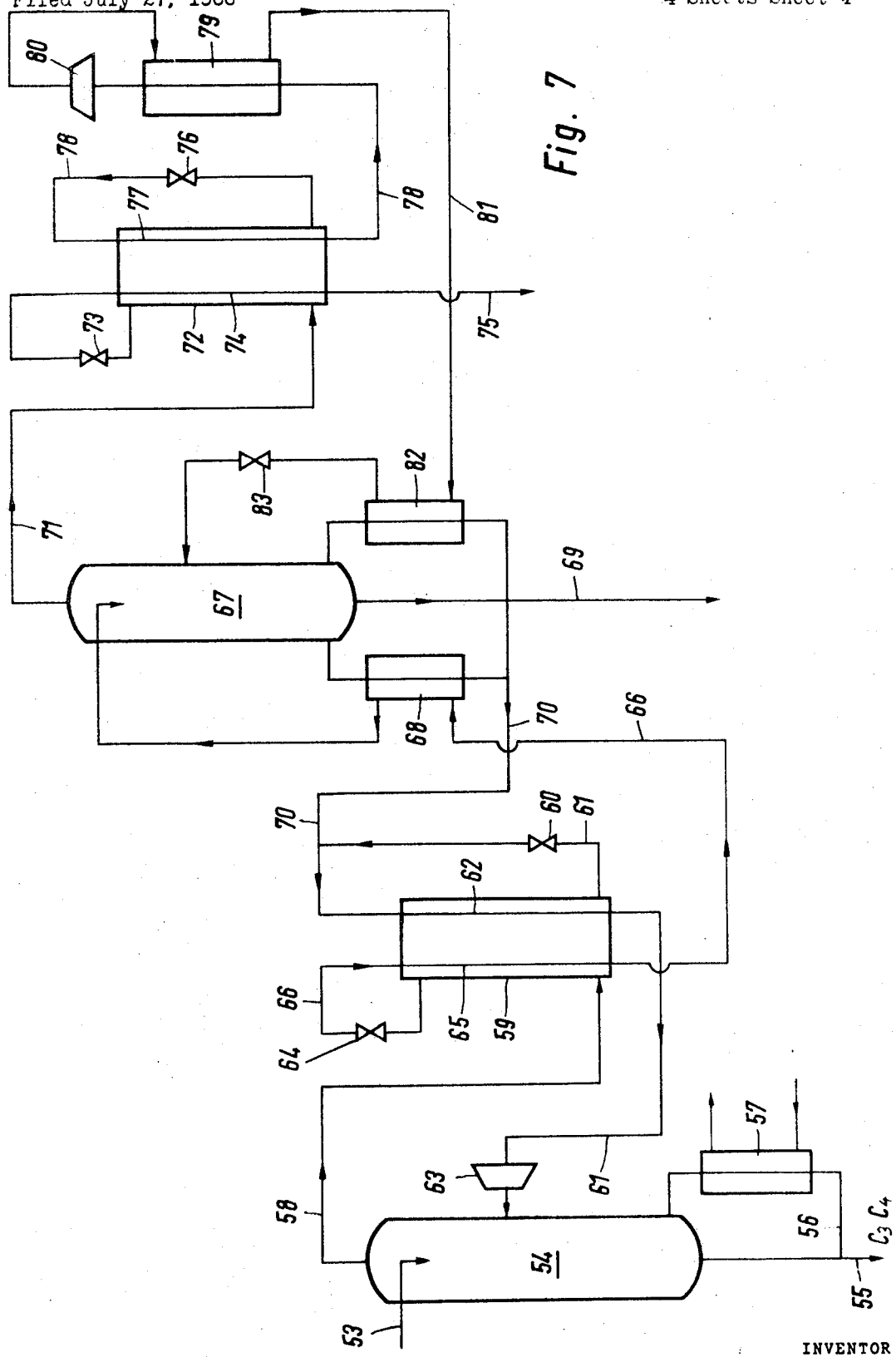
FIG. 7 is a schematic diagram of an apparatus for the separation of a mixture containing a relatively large number of components.

The plant shown in FIG. 7 is particularly advantageous for use in the separation of, for example, a gas mixture having four different high hydrocarbons. In the more detailed description of the operation of the plant shown in FIG. 7, an exemplary mixture of methane, ethane, propane, and butane is supplied in the liquid phase via a conduit 53 to rectification column 54. By using this mixture of gases, propane and butane can be withdrawn in the liquid phase via conduit 55 from the bottom of rectification column 54. An evaporator 57 inserted in the conduit system 56 is used to heat the sump liquids and produce the necessary rectification gases in rectification column 54.

The gas mixture leaving the head of rectification column 54 via conduit 58 consists essentially of methane and ethane, but still contains a residual quantity of propane and butane. This gas mixture then passes into dephlegmator 59, where a portion thereof is condensed. The resultant condensate is expanded in throttle valve 60 and re-introduced, via conduit 61, into column 54 at about the midsection thereof. (A point in the column corresponding to the concentration of the steam.) Before entering column 54, the condensate is warmed in a first flow channel 62 of dephlegmator 59 by indirect heat exchange with condensing gas mixture, the warmed gases then being compressed in compressor 63.

The remainder of the gas mixture, freed from propane and butane, is expanded in throttle valve 64, warmed in a second flow channel 65 of dephlegmator 59 by indirect heat exchange with condensing gas mixture, and fed in the liquid phase, via conduit 66, to a further rectification column 67. The required rectifying vapors are generated in evaporator-condenser 68 at the bottom of column 67, there being used as the heating medium, the remainder of the gas mixture flowing through conduit 66.

The ethane contained in the original gas mixture leaves the plant via conduit 69 at the bottom of column 67. A portion of the sump liquid in column 67, rich in ethane, is passed through conduit 70, and admixed with the expanded condensate from dephlegmator 59. The combined liquid is warmed in the first flow channel 62, brought to an elevated pressure in compressor 63, and then supplied to rectification column 54.

Methane, contaminated with ethane, is collected at the head of rectification column 67 and passed, via a conduit 71, to a further dephlegmator 72, where a portion of the methane is condensed along with the entire amount of still ambient ethane. The residual gaseous phase of practically pure methane is expanded in throttle valve 73, warmed in a first flow channel 74 of dephlegmator 72 by heat exchange with evaporating gas mixture, and withdrawn from the plant through conduit 75.

The condensate formed in dephlegmator 72, which is greatly enriched in ethane, is likewise further expanded in throttle valve 76, evaporated in a second flow channel 77 of dephlegmator 72 by heat exchange with condensing gas mixture, and fed, via conduit 78, to a countercurrent heat exchanger 79 wherein the evaporated condensate is further warmed. After being warmed in countercurrent heat exchanger 79, the gases are compressed to an elevated pressure in compressor 80, and then cooled in countercurrent heat exchanger 79. The re-cooled gas mixture passes, via a conduit 81 through condenser evaporator 82, where it is liquefied by heat exchange with evaporating sump liquid of the rectification column 67, is then expanded in throttle valve 83, and re-introduced into column 67 at a point corresponding to its composition.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the separation of a mixture having components with widely different boiling points, which process comprises the steps of:

(a) rectifying in a distillation column said mixture which is supplied at an upper section thereof at least partly in the liquid phase, and withdrawing from the column a bottoms fraction enriched in higher boiling component and a gaseous overhead fraction enriched in lower boiling point component;

(b) treating gaseous overhead fraction alone in a further separation step comprising partially condensing gaseous overhead fraction in cyclically interchangeable regenerators, expanding the uncondensed gaseous fraction and passing a portion of the expanded uncondensed gaseous fraction during a regenerative cooling cycle through the regenerator being scavenged, removing a fraction of condensed higher boiling components from said further separation step, and withdrawing another and remaining portion of said treated gaseous fraction as product; and (c) recycling to the distillation column all higher boiling point fraction resulting from step (b), all of said latter fractions being introduced into the column at about the midpoint thereof.

References Cited

UNITED STATES PATENTS

| 2,880,592 | 4/1959 | Davison et al. | 62—28 XR |
|---|---|---|---|
| 2,939,293 | 6/1960 | Green | 62—28 XR |
| 3,242,682 | 3/1966 | English | 62—28 |
| 3,320,754 | 5/1967 | Tucker et al. | 62—28 |
| 2,530,602 | 11/1950 | Dennis | 62—26 XR |
| 2,765,637 | 10/1956 | Etienne | 62—27 |
| 2,785,548 | 3/1957 | Becker | 62—13 XR |
| 2,994,644 | 8/1961 | Clay. | |
| 3,186,182 | 6/1965 | Grossmann et al. | 62—26 |
| 3,216,206 | 11/1965 | Kessler | 62—13 |
| 3,262,278 | 7/1966 | Thorsten et al. | 62—28 XR |
| 2,214,368 | 9/1940 | Greensfelder et al. | 203—75 |
| 2,240,752 | 5/1941 | Bogart et al. | 203—75 |
| 3,230,155 | 1/1966 | Schurch | 203—82 |

WILBUR L. BASCOMB, JR., Primary Examiner

U.S. Cl. X.R.

62—12, 17, 18, 39; 203—87; 208—351